(12) United States Patent
Norris et al.

(10) Patent No.: US 11,882,962 B2
(45) Date of Patent: *Jan. 30, 2024

(54) GRILL WITH FLAT TOP GRIDDLE AND VERTICALLY ADJUSTABLE SWINGING ACCESSORIES

(71) Applicant: Norris Manufacturing Inc., Tippecanoe, IN (US)

(72) Inventors: Aaron Lee Norris, Mentone, IN (US); Daron Lee Norris, Mentone, IN (US)

(73) Assignee: Norris Manufacturing Inc., Tippecanoe, IN (US)

( * ) Notice: Subject to any disclaimer, the term of this patent is extended or adjusted under 35 U.S.C. 154(b) by 399 days.

This patent is subject to a terminal disclaimer.

(21) Appl. No.: 17/248,088

(22) Filed: Jan. 8, 2021

(65) Prior Publication Data

US 2021/0361118 A1 Nov. 25, 2021

Related U.S. Application Data

(63) Continuation of application No. 15/929,774, filed on May 21, 2020, now Pat. No. 10,888,195.

(51) Int. Cl.
*A47J 37/07* (2006.01)
*A47J 37/06* (2006.01)
*A47J 33/00* (2006.01)

(52) U.S. Cl.
CPC .......... *A47J 37/0786* (2013.01); *A47J 33/00* (2013.01); *A47J 37/067* (2013.01); *A47J 2037/0795* (2013.01)

(58) Field of Classification Search
CPC ...... A47J 37/0786; A47J 33/00; A47J 37/067; A47J 2037/0795; A47J 37/06; A47J 2037/07

See application file for complete search history.

(56) References Cited

U.S. PATENT DOCUMENTS

| | | |
|---|---|---|
| 1,392,071 A | 9/1921 | Maranville |
| 2,827,846 A | 3/1958 | Karkling |
| 2,943,557 A | 7/1960 | Suehlsen |
| 4,850,333 A | 7/1989 | Dellrud et al. |
| 5,490,452 A | 2/1996 | Schlosser et al. |
| 6,070,571 A | 6/2000 | Bradbury |
| 6,640,797 B1 | 11/2003 | Magers |

(Continued)

OTHER PUBLICATIONS

Arteflame, Web Page-Wood—Fire Grills, 1 page Retrieved from the Internet: https://arteflame.com/, Apr. 17, 2020.

*Primary Examiner* — Alfred Basichas
(74) *Attorney, Agent, or Firm* — Woodard, Emhardt, Henry, Reeves & Wagner, LLP

(57) ABSTRACT

A live-fire grill has been developed with a central opening and one or more adjustable accessories. In one example, the central opening is covered by a central grate to provide a more typical grilling experience. In another example, the central grate is raised to prevent food loss down the central opening. Surrounding the central opening is a griddle with an outer periphery defining a retention ledge. The retention ledge serves as a backstop to prevent food falling off the griddle and onto the ground. Attached to the grill is one or more rods holding one or more adjustable accessories. The accessories automatically lock in position and may be adjusted both horizontally and vertically. In one example, the accessory is an adjustable grate with 360 degrees of rotation.

16 Claims, 16 Drawing Sheets

(56) References Cited

U.S. PATENT DOCUMENTS

| | | |
|---|---|---|
| 6,799,567 B1 | 10/2004 | Genest |
| 2014/0238377 A1 | 8/2014 | Moore et al. |
| 2014/0261379 A1 | 9/2014 | Mehler et al. |
| 2014/0311356 A1 | 10/2014 | Daniels |
| 2017/0273503 A1 | 9/2017 | Schuitemaker |
| 2018/0317706 A1 | 11/2018 | Graves et al. |

GRILL WITH FLAT TOP GRIDDLE AND VERTICALLY ADJUSTABLE SWINGING ACCESSORIES

CROSS-REFERENCE TO RELATED APPLICATION

This application is a continuation of application Ser. No. 15/929,774, filed May 21, 2020, which is hereby incorporated by reference.

BACKGROUND

Grills are typically sized for only one individual to grill at a time. The shape and design of the grill does not allow for more than one person to have access to the grilling surface. Additionally, the majority of grills have a limited amount of space for cooking different food types with different temperature requirements. For example, a grill may have two different height grilling grates, but a limited number of options for mounting a wok, rotisserie, and/or placing a cooking pot. This results in a need for either multiple grills or waiting for one food item to finish cooking before being able to start another. Grills are also unable to be modified to fit an individuals needs. Generally each grill is in the same configuration with the same components.

Thus, there is a need for improvement in this field.

SUMMARY

A unique live-fire grill has been developed with a flat top griddle and vertically adjustable swinging accessories such as grill grates. The flatbed griddle has a generally circular shape with a central opening. Around the outer circumference of the griddle, the grill has a ledge that disposes around the outer circumference of the griddle to prevent food from accidentally sliding off the griddle. In one form, a rod is bent and welded to the outer circumference of the griddle to form the ledge. The flatbed griddle has a concave shape for directing grease, fat, or other material to the central opening.

The griddle rests on a cylindrical drum so that the griddle is at a comfortable height for the user when standing. Underneath the griddle, a fire basket, where twigs, charcoal, and/or other fuel burns, hangs from the rim of the drum. The barrel includes a sliding vent door that adjusts the amount of air supplied to the fire. The exhaust from the fire is vented through the central opening of the griddle.

In one use case scenario, a wok, pot, pan, or other cooking container can be placed over the central opening. In another use case scenario, the central opening is covered by a central grate. In one form, the central opening has a shoulder that supports the grate or the grate can be raised (e.g., flipped) to provide a backstop for helping scoop up food or other items from the griddle.

The grill has two or more rods that support the vertically adjustable accessories. For the purposes of explanation, the accessories will be described as swingable cooking grates, but other types of accessories such as rotisseries and hoods can be used in a similar manner. The location of the grates can be vertically and horizontally adjusted to change cooking conditions. For example, the grates are able to horizontally swing away from the central opening so that the temperature of the food on the accessory is able to be controlled and/or adjusted. In one form, the grates are shaped in a fashion similar to a tennis racket with a handle and an arm that attaches the handle to a grate section or head where food is placed. The arm defines an opening in which the rods are received. The opening in the arm is positioned closer to the handle so that the grate section tips downwards so as to lock the grate vertically in position. With the grate vertically locked, the handle can be used to swing the grate section around the rod.

The system and techniques as described and illustrated herein concern a number of unique and inventive aspects. Some, but by no means all, of these unique aspects are summarized below.

Aspect 1 generally concerns a system that includes a grill with a griddle surrounding a central opening.

Aspect 2 generally concerns the system of any previous aspect in which the griddle has a retention ledge surrounding the outer circumference of the griddle.

Aspect 3 generally concerns the system of any previous aspect in which the retention ledge includes a rod welded around the outer circumference of the griddle.

Aspect 4 generally concerns the system of any previous aspect in which the griddle has a concave shape.

Aspect 5 generally concerns the system of any previous aspect in which the grill has one or more accessories.

Aspect 6 generally concerns the system of any previous aspect in which the accessories are configured to swing away from the central opening in a horizontal direction.

Aspect 7 generally concerns the system of any previous aspect in which the accessories are configured to move in a vertical direction.

Aspect 8 generally concerns the system of any previous aspect in which the accessories are mounted to one or more rods attached to the grill.

Aspect 9 generally concerns the system of any previous aspect in which the accessories are configured to automatically lock in place.

Aspect 10 generally concerns the system of any previous aspect in which the accessories each has at least one opening where at least one of the rods is received.

Aspect 11 generally concerns the system of any previous aspect in which the openings in the accessories are at an offset location to tilt the accessories so that gravity is used to automatically lock the accessories in place.

Aspect 12 generally concerns the system of any previous aspect in which the grill has two or more of the rods.

Aspect 13 generally concerns the system of any previous aspect in which the accessories include a grate.

Aspect 14 generally concerns the system of any previous aspect in which the accessories include a hood.

Aspect 15 generally concerns the system of any previous aspect in which the accessories include a rotisserie.

Aspect 16 generally concerns the system of any previous aspect in which the grill includes a drum on which the griddle rests.

Aspect 17 generally concerns the system of any previous aspect in which the grill includes a fire basket that is positioned below the griddle.

Aspect 18 generally concerns the system of any previous aspect in which the fire basket has a frustoconical shape.

Aspect 19 generally concerns the system of any previous aspect in which the drum has a height that locates the griddle at a standing height of a user.

Aspect 20 generally concerns the system of any previous aspect in which the grill has a central grate that covers the central opening.

Aspect 21 generally concerns the system of any previous aspect in which the grill has a shoulder around the central opening on which the central grate rests flush with the griddle.

Aspect 22 generally concerns the system of any previous aspect in which the central grate is raised above the griddle.

Aspect 23 generally concerns the system of any previous aspect in which the central grate has a sidewall with one or more exhaust openings.

Aspect 24 generally concerns the system of any previous aspect in which the central opening is sized to heat a cooking pot.

Aspect 25 generally concerns a method of operating the system of any previous aspect.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
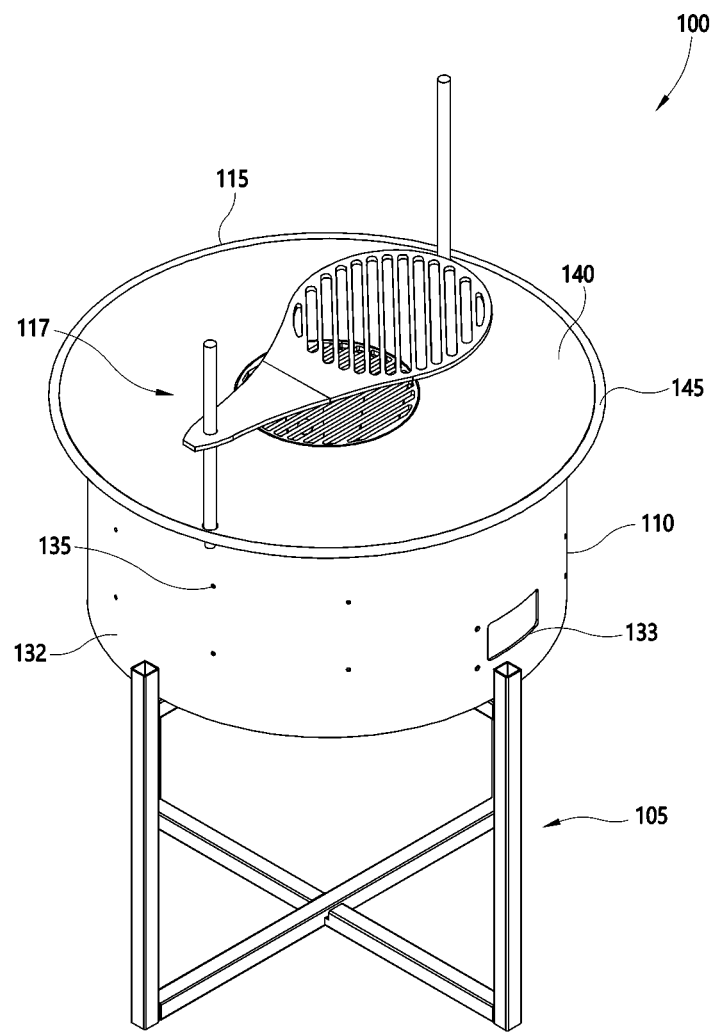
FIG. 1 is a perspective view of a grill.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 is a perspective view of a grill 100 that is used to cook food. In one form, the grill 100 is designed to be portable such that the grill 100 can be used for camping, tailgating, and the like. In another variation, the grill 100 is designed to be a permanent fixture at a location such as in commercial or home settings. To enhance the durability, the grill 100 is made of metal such as industrial grade steel and/or aluminum. For instance, some or all of the cooking surfaces in certain examples are made of stainless steel. It should be recognized that all or part of the grill 100 can be made from other types of materials such as plastic, wood, and/or glass. As will be explained below, the grill 100 is designed to allow multiple individuals to grill a variety of items at the same time or at different times, if so desired. Different cooking techniques for cooking different foods can be used at the same time. Moreover, the design of the grill 100 is conducive for promoting conversation and camaraderie.

As shown, the grill 100 includes a support section 105, a heating section 110, a cooking section 115, and an accessory section 117. The support section 105 is configured to support the heating section 110, the cooking section 115, and the accessory section 117 of the grill 100. In one form, the support section 105 has a height that promotes cooking on the cooking section 115 when standing, and in other forms, the support section 105 can have a height that promotes cooking when sitting or in other positions.

The heating section 110 is configured to warm, cook, and/or otherwise heat food on the cooking section 115 by burning fuel such as wood, propane, and/or charcoal. The heating section 110 has a body 132 that rests on the support section 105. In one embodiment, the body 132 is cylindrical in shape. In one form, the body 132 is formed out of a steel or metal drum. The cylindrical shape of the body 132 allows for multiple users to grill at the same time, and this cylindrical shape allows them to safely and easily move around the grill 100. The body 132 in other examples can be shaped differently. For example, the body 132 has a rectangular shape in other variations. As will be explained in greater detail below, the heating section 110 is designed to lower or otherwise minimize the heat from the combustion process transferring to the body 132 so as to keep the body 132 at a reasonable temperature. The outer appearance of the body 132 is preserved and the operational life of the body 132 is increased by keeping the body 132 at a reasonably low temperature. At the lower temperatures, there is less risk of paint and/or other protective cover materials from peeling off the body 132. Moreover, the risk of accidental burning is reduced.

The body 132 defines or has a dampener 133 that controls the combustion process in the heating section 110 by regulating the air intake into the heating section 110. For example, fully opening the dampener 133 allows a large volume of air to be supplied to the heating section 110. When the dampener 133 is partially closed, the dampener 133 restricts the air flow into the heating section 110. As should be appreciated, restricting the air flow into the heating section 110 can result in less combustion, flame, and/or heat. The dampener 133 can also be fully closed to snuff out the fire in the heating section 110.

The body 132 further defines one or more mounting holes 135 that are configured to mount an object such as a nameplate. Alternatively or additionally, the mounting holes 135 are configured to receive one or more hooks. The hooks can be used to hang a variety of grilling tools such as tongs, basters, and/or spatulas.

As depicted in FIG. 1, the cooking section 115 is positioned above the heating section 110 so that heat from the combustion in the heating section 110 is transferred to heat the cooking section 115. The cooking section 115 generally provides a surface and/or area where the food is warmed, cooked, and/or otherwise heated. The cooking section 115 includes a griddle 140 with a retention ledge 145. Unlike a cooking grate, the griddle 140 provides a relatively smooth, continuous surface on which food items can be cooked like pancakes, eggs, vegetables, and French toast, to name just a few. As can be seen, the griddle 140 lacks any type of grate openings and is relatively flat. It should be noted that the griddle 140 slightly declines or lowers from the outer periphery to the center of the griddle 140 so that the griddle 140 has a frustoconical shape. With the griddle 140 becoming lower to the center, grease, charred foods, and other materials drain toward the center of the griddle 140. In one variation, the griddle 140 is made of stainless steel, but the griddle 140 can be made of other cooking grade materials. The griddle 140 in one form is coated with a non-stick coating. In the illustrated embodiment, the griddle 140 has a circular shape, but the griddle 140 can be shaped differently in other embodiments. For example, the griddle 140 has a rectangular shape in other embodiments.

As many have experienced during cooking, when burgers, pancakes, hot dogs, and other foods are flipped or otherwise moved, sometimes the food is pushed off the cooking surface, such as a grill, by the cooking utensil like a spatula. Nothing is more frustrating than having a perfectly cooked steak or hamburger fall onto the ground during a cookout. To reduce this risk, the retention ledge 145 surrounds the outer periphery or circumference of the griddle 140. The retention ledge 145 is raised relative to the surface of the griddle 140 so that the retention ledge 145 acts as a lip so as to prevent food or other items from being accidentally pushed off the griddle 140. In the illustrated example, the retention ledge 145 surrounds the complete outer circumference of the griddle 140, and in other examples, the retention ledge 145 has an arced shape so as to only partially surround the outside of the griddle 140.

Cooking temperatures, cooking techniques, cooking times, and other cooking conditions are always a concern during grilling. Not all foods require the same temperatures or conditions. Timing is also critical. Some foods require low heat, slow cooking conditions, while others require just a quick sear. Making sure that all of the food is warm and finished on time can be extremely challenging, especially when cooking out, tailgating, or camping. As will be explained further below, the accessory section 117 also has different cooking accessories, such as grates, baskets, rotisseries, and the like, to be used sequentially or simultaneously. The accessory section 117 is designed for allowing the accessories to be easily secured, positioned, and removed from the grill 100. The accessory section 117 allows the cooking accessories to be readily moved both vertically and horizontally to adjust the position of the food on the accessory relative to the heat of the heating section 110 and cooking section 115. For example, the food on the accessory can be horizontally removed from any direct flames, but the food can be vertically close to the cooking section 115 so as to experience high heat. The accessory can be raised vertically to a position where the food is just kept warm.

As noted before, the grill 100 is designed to allow more than one individual to cook at the same time. For instance, someone can cook on the cooking section 115 at the same time someone else is minding the food in the accessory section 117. Having more than one individual work at a time helps to reduce the risk of food accidentally burning due to inattentiveness because there is someone else paying attention.

Figure 2:
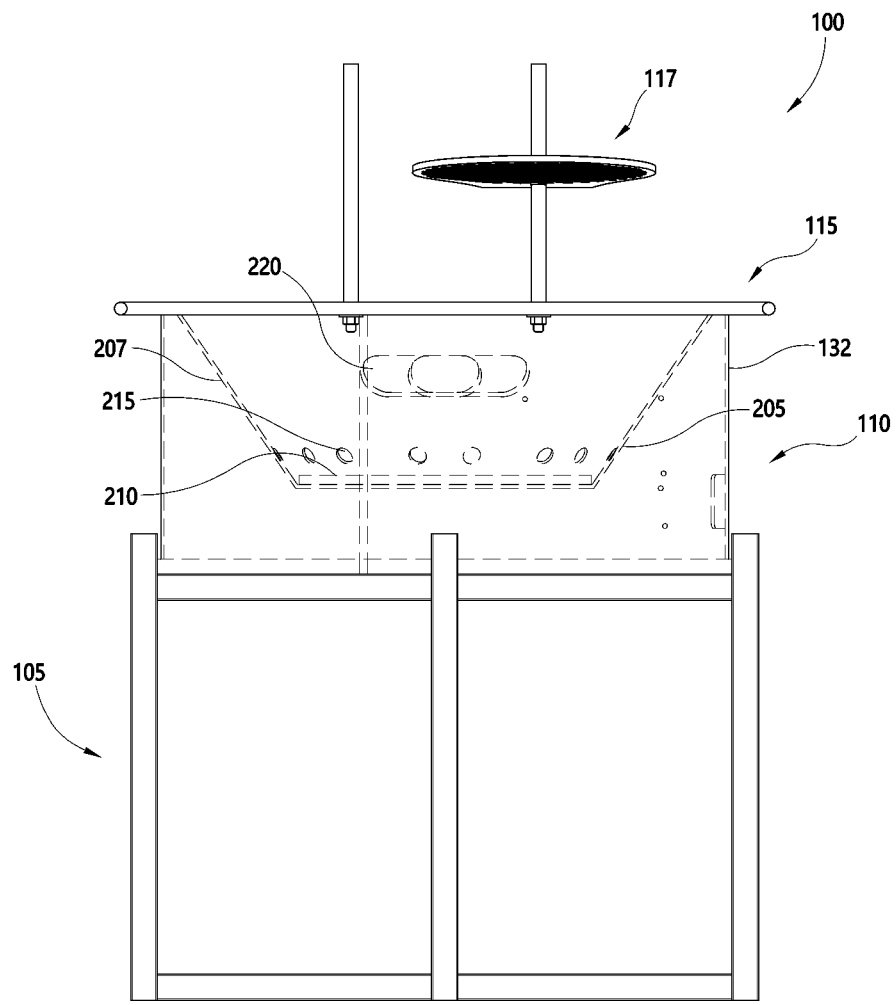
FIG. 2 is a cross-sectional view of the grill of FIG. 1.
Figure 3:
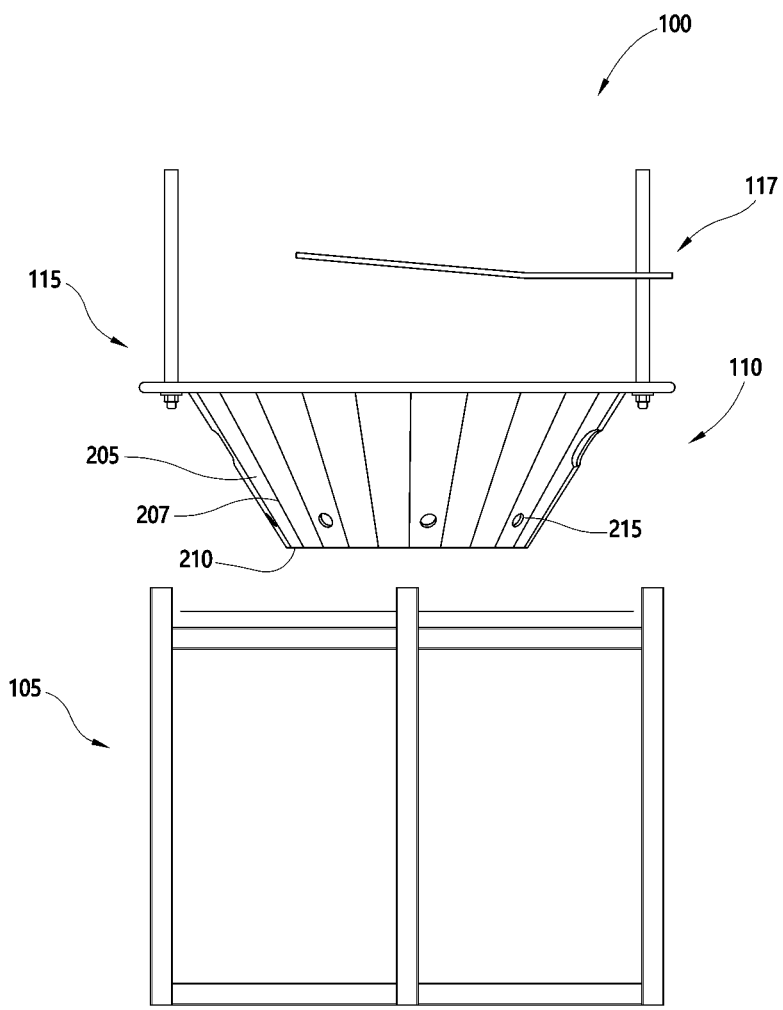
FIG. 3 is an exploded view of the grill of FIG. 1.

As shown in FIGS. 2 and 3, the heating section 110 of the grill 100 includes a fire box 205 in which the fuel is combusted to supply heat and/or smoke for cooking the food. The fire box 205 has a sidewall 207 that extends from a base 210. The sidewall 207 defines one or more intake holes 215 and an aperture 220.

As alluded to before, the fire box 205 is designed to reduce the amount of heat transferred from the fire box 205 to the body 132. This helps to preserve the paint covering the body 132 as well as reduces the risk of severe burns to individuals. As can be seen, the sidewall 207 of the fire box 205 is spaced away from the body 132, and the base 210 of the fire box 205 is spaced away from the support section 105 to form an air gap. This air gap provides a layer of insulation. As should be appreciated, the shape of the fire box 205 creates different temperature zones on the cooking section 115 and in the accessory section 117. In one form, the fire box 205 concentrates the higher temperatures toward the center of the cooking section 115.

In the illustrated example, the fire box 205 has a generally frustoconical shape. The frustoconical shape of the fire box 205 creates a greater distance from the sidewall 207 to the body 132 towards the bottom of the fire box 205. However, the upper portion of the sidewall 207 still covers the entire griddle 140. This allows the body 132 to be generally cool to the touch even when the grill 100 is in use. As a result, a user can briefly touch the body 132 without much fear of a burn. The base 210 serves as a support surface for the fuel added to the fire box 205. Many fuel types are compatible with the grill 100. Some non-limiting examples include wood chips, charcoal, propane, and/or wood.

The intake hole 215 allows air to flow in from the dampener 133 to the fire box 205. The intake holes 215 are spaced to allow even air distribution throughout the fire box 205, thus enhancing the flame. The aperture 220 is likewise to control airflow into the fire box 205. In the depicted example, the fire box 205 has two apertures 220 located on opposite sides of the fire box 205, but the fire box 205 in other examples can include more or less apertures 220 than is shown. The apertures 220 are located vertically up the sidewall 207 relative to the intake holes 215 to add additional airflow above the burning fuel.

Figure 4:
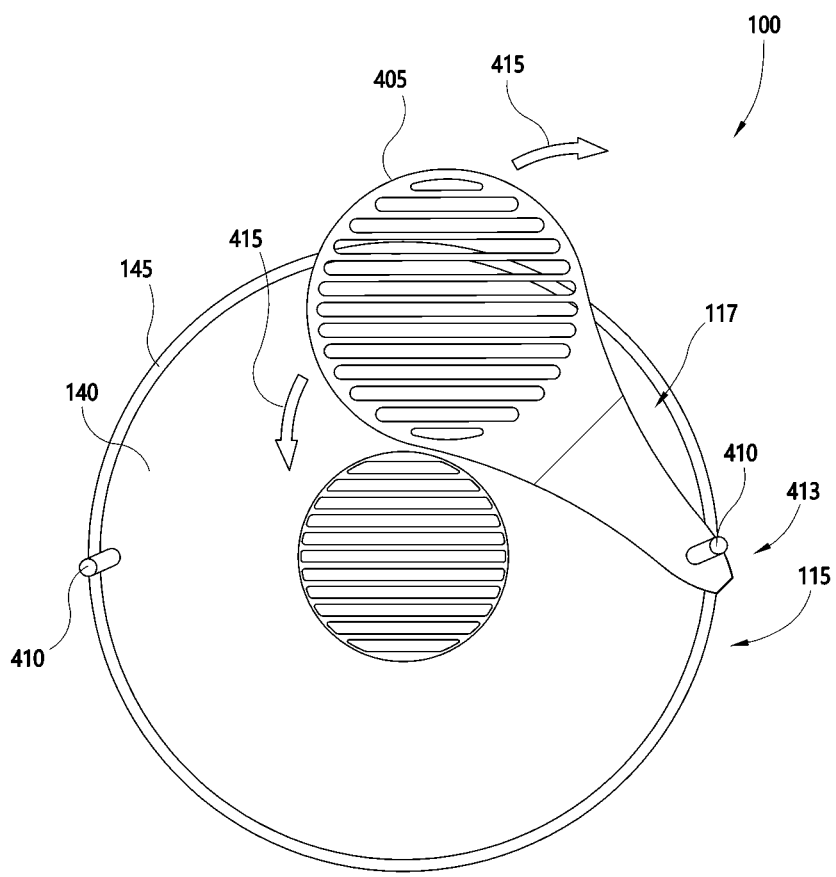
FIG. 4 is a top view of the grill of FIG. 1.

Turning to FIG. 4, the accessory section 117 is configured to allow the cook to cook different foods under a wide variety of changeable cooking conditions and temperatures. As shown, the accessory section 117 includes a cook accessory 405 and a support 410 that supports the cook accessory 405. In the illustrated example, the cook accessory 405 is a grate, but in other examples, other types of cooking accessories can be used. For example, the cook accessory 405 can include a rotisserie, hood, pot, pan, griddle, and/or wok, to name a few. As should be recognized, cooking utensils, such as spatulas, forks, and tongs, are hand tools that separate from the grill 100, and cooking utensils typically are used to move or manipulate food on the grill 100. On the other hand, the support 410 is generally designed to be a cooking platform attached to the grill 100 that supports the food in a stationary position (e.g., a grate) or at a moving pattern (e.g., the rotary motion in a rotisserie) at the grill 100. In some cases, the cook accessory 405 is secured to the heating section 110 so as to redirect smoke and/or heat for cooking purposes.

To adjust the heat and/or smoke when cooking the food, the cook accessory 405 is vertically adjustable along the support 410 so as to adjust the distance of the cook accessory 405 relative to the cooking section 115. The cook accessory 405 is designed to readily move vertically. Once at the desired vertical level, the cook accessory 405 is configured to securely lock into place at the vertical level. The cook accessory 405 in one version is designed to be vertically moveable and able to lock into place by using just one hand. This one-handed adjustment frees the other hand of the cook which is helpful during cooking. In the illustrated example, the cook accessory 405 is coupled to the support 410 via an automatic lock mechanism 413 that securely holds the support 410 as a desired vertical position. In one version, the lock mechanism 413 uses gravity to vertically lock the cook accessory 405 to the support 410. The center of gravity of the cook accessory 405 is offset from where the cook accessory 405 is secured to the support 410. This causes the cook accessory 405 to tilt relative to the support 410 which in turn causes the cook accessory 405 to dig into or frictionally engage the support 410. To move the cook accessory 405, the cook accessory 405 is tilted relative to the support 410 and slid along support 410. Upon reaching the desired vertical position, the cook accessory 405 is titled back to the normal cooking position to lock the cook accessory 405 in place along the support 410. The weight of the cook accessory 405 along with any food on the accessory helps to lock the cook accessory 405 into place along the support 410. Other types of lock mechanisms 413 can be used in other examples. For example, a spring type latch or locking mechanism can be used.

The cook accessory 405 is further horizontally adjustable over the cooking section 115. By the cook accessory 405 being able to move in a horizontal plane, the heat and/or smoke applied to the food on the cook accessory 405 can be adjusted. As indicated by arrows 415 in FIG. 4, the cook accessory 405 is able to swing relative to the support 410 within a horizontal plane. The cook accessory 405 can be completely swung away from the cooking section 115 so that the cook is able remove, coat, baste, or otherwise interact with the food without the intense heat of the cooking section 115. The cook accessory 405 can also be swung back over the cooking section 115 so that the food on the cook accessory 405 experiences greater heat and/or smoke. Typically, but not always, the food on the cook accessory 405 experiences the highest heat and smoke levels when placed directly over the center of the cooking section 115 of the grill 100.

In in the illustrated example, the support 410 is a cylindrical rod that is fastened to the cooking section 115 of the grill 100. The cylindrical shape of the support 410 facilitates the horizontal swinging motion. In one form, the support 410 generally remains stationary as the cook accessory 405 swings about the support 410. The support 410 can have a different shape and/or be attached in a different manner to the rest of the grill 100. For example, the support 410 can have a rectangular cross-sectional shape, and the support 410 is rotationally coupled to the heating section 110 and/or the cooking section 115 through a bearing. When the cook accessory 405 is horizontally moved or swung, the cook accessory 405 and support 410 move together. The support 410 rotates relative to the rest of the grill 100 via the bearing.

Figure 5:
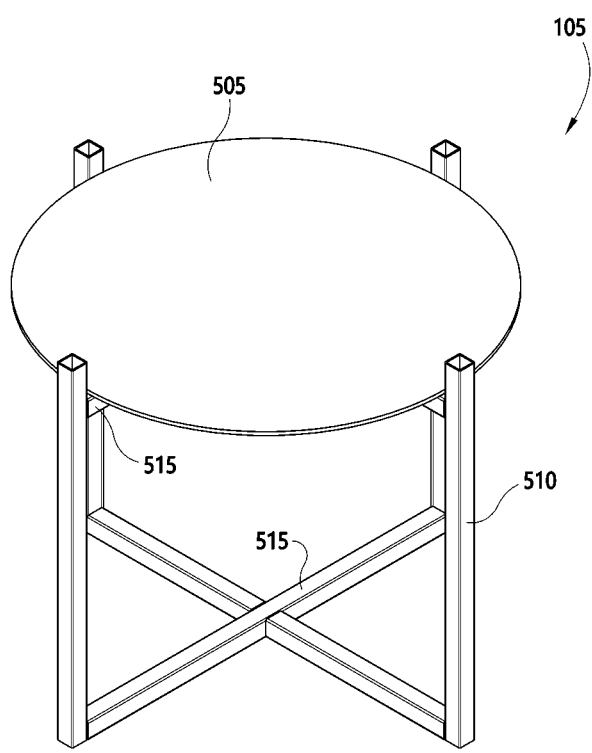
FIG. 5 is a perspective view of a support section of the grill of FIG. 1.

As illustrated in FIG. 5, the support section 105 includes a support rack 505, one or more struts 510, and one or more cross members 515. The support rack 505 serves as a support surface for the heating section 110 and the cooking section 115. The support rack 505 can also act as a heat and/or drip shield. In one example, the support rack 505 is circular and made of a plate steel. However, in other examples, the support rack 505 is rectangular and made of an aluminum material. Supporting the support rack 505 are the one or more struts 510 and the one or more cross members 515. The struts 510 are configured to receive the cross members 515. The cross members 515 are configured to interlock. The interlocking connection of the cross members 515 forms a solid connection that allows the support rack 505 to support the weight of the cooking section 115. For example, the support rack 505 rests directly on top of one or more cross members 515. The weight of the cooking section 115 is then distributed through the cross members 515 and onto the struts 510. This distribution of weight allows the support section 105 to form a solid base to assure the grill 100 remains sturdy throughout use.

Figure 6:
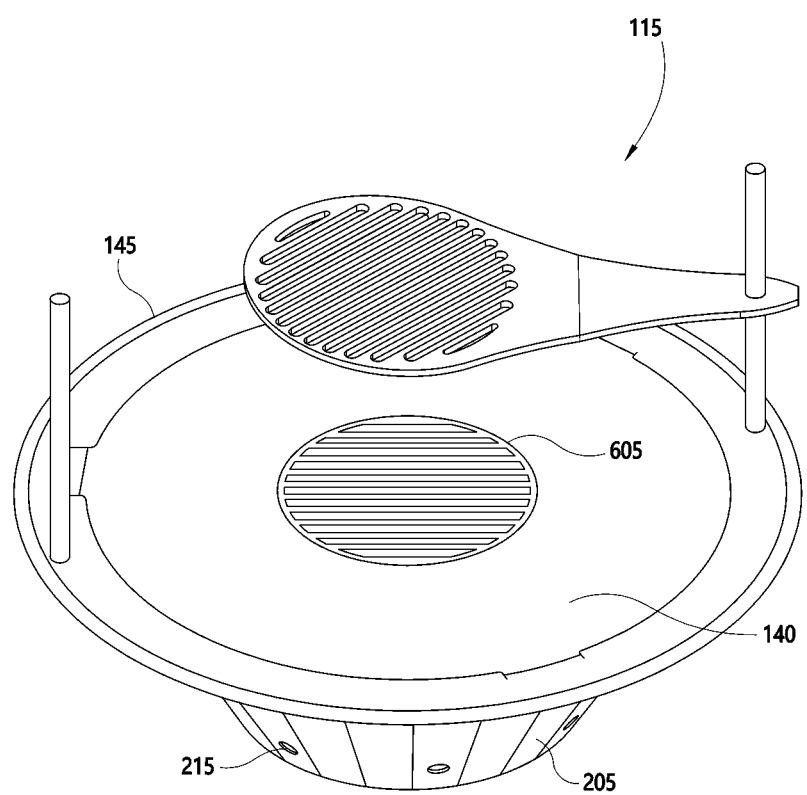
FIG. 6 is a perspective view of a cooking section of the grill of FIG. 1.
Figure 7:
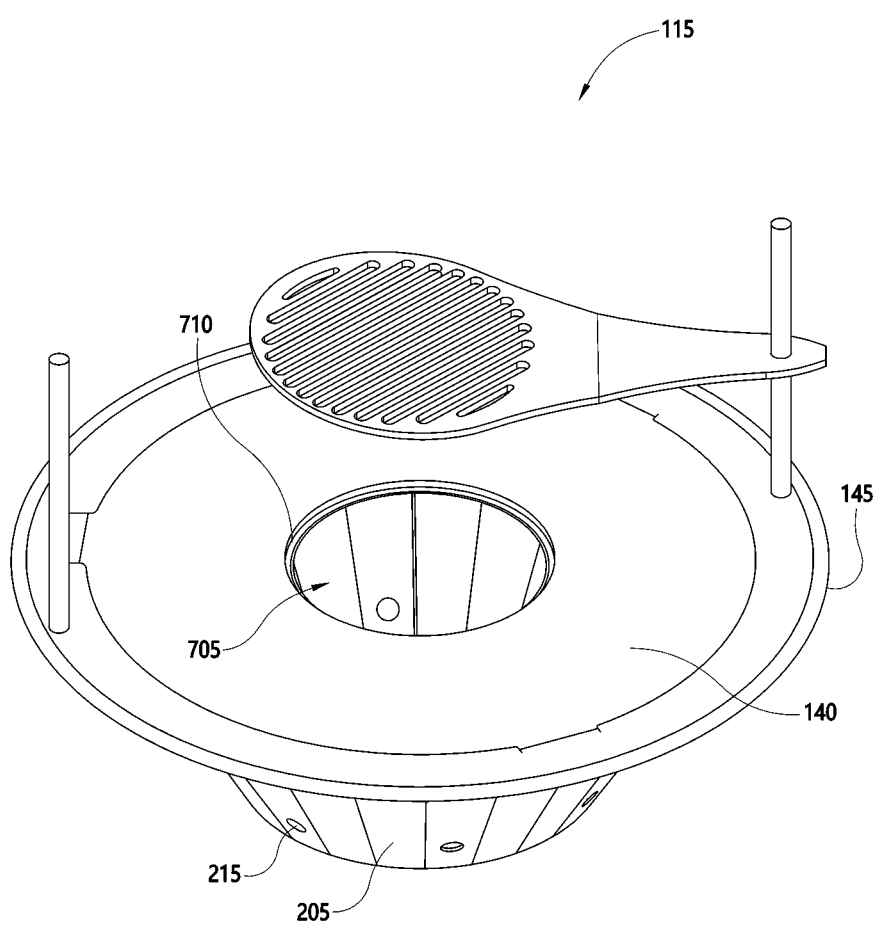
FIG. 7 is a perspective view of the cooking section of FIG. 6 without a central grate.

As can be seen in FIGS. 6 and 7, the griddle 140 includes a central grate 605. The central grate 605 is configured to provide a user with a more typical grilling experience, for example, if the user desires to make steaks with the sought after grill marks. Additionally, the central grate 605 provides the user with a larger surface area for cooking food items. The central grate 605 also allows for multiple different cooking methods on the same cooking section 115, for example, hamburgers cooked on the griddle 140 and steaks cooked on the central grate 605. The central grate 605 covers a central opening 705 and rests on a support ring 710. This mounting configuration allows the central grate 605 to be easily removed and attached by a user. For example, if a user wants to remove the central grate 605, the user simply lifts upwards and pulls the central grate 605 out of the central opening 705.

When the central grate 605 is removed, the central opening 705 has many uses. For example, the central opening 705 is used for loading fuel into the fire box 205. In another example, the central opening 705 is used as a fire pit. In yet another example, the central opening 705 is used for cooking food items over an open flame. As noted before, the griddle 140 forms a cooking surface that angles towards the central opening 705. With this frustoconical shape, the griddle 140 is able to direct grease, other liquids, and food scraps toward the central opening 705 for burning. It should be noted that the central grate 605 and the central opening 705 can define multiple opening shapes. In one example, the central grate 605 and the central opening 705 define a circle. In another example, the central grate 605 and the central opening 705 define a rectangle.

Figure 8:
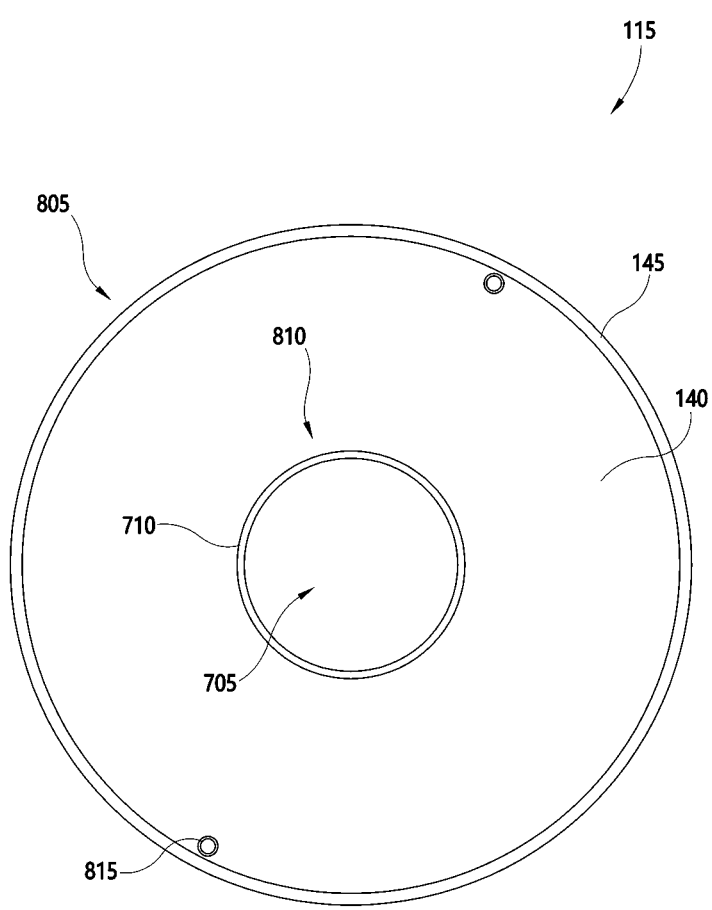
FIG. 8 is a top view of the cooking section of FIG. 7.

Looking at FIG. 8, the griddle 140 includes an outer periphery 805 and an inner periphery 810. The outer periphery 805 defines the external edge of the griddle 140 and includes the retention ledge 145. The inner periphery 810 defines the internal edge of the griddle 140 and includes the external bounds of the central opening 705. Put differently, the griddle 140 occupies the area between the outer periphery 805 and the inner periphery 810. Alternatively or additionally, the griddle 140 creates a concave form from the outer periphery 805 to the inner periphery 810, meaning the inner periphery 810 is generally lower than the outer periphery 805. The gradual slope from the outer periphery 805 to the inner periphery 810 allows grease and other liquids to run towards the central opening 705. As should be appreciated, this allows the griddle 140 to remain clear of grease and other contaminants during cooking. Additionally, this assists a user in clean-up as the grease and liquids are consumed by the flames in the heating section 110. The griddle 140 further includes one or more mounting apertures 815. The mounting apertures 815 serve as the mounting location for the accessory section 117.

Figure 9:
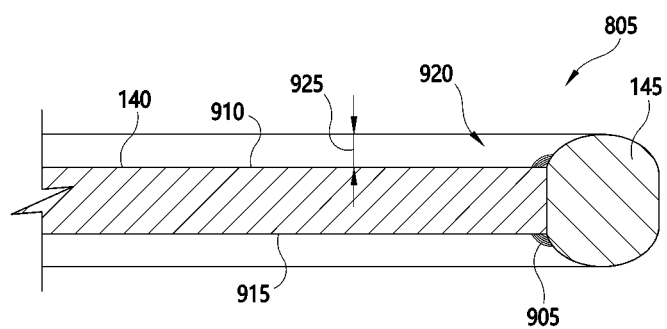
FIG. 9 is a partial cross-sectional view of the cooking section at an outer periphery.

As illustrated in FIG. 9, a weld 905 secures the griddle 140 to the retention ledge 145. The weld 905 is a continuous connection on the top, bottom, and/or top and bottom of the griddle 140. As should be recognized, the retention ledge 145 can be secured to the griddle 140 in other manners. The retention ledge 145 in the depicted example is formed by a solid cylindrical rod. The retention ledge 145 is configured to protect the outer periphery 805 such as during shipping and/or storage. The rounded nature of the retention ledge 145 also helps to reduce the risk of injuries. It should be appreciated that the retention ledge 145 can be shaped differently in other examples.

As shown, the griddle 140 has a cooking surface 910 where food is cooked and a heating surface 915 that is located opposite the cooking surface 910. The heating surface 915 is heated by the fire in the fire box 205. As can be seen, the retention ledge 145 forms a raised lip 920. Relative to the cooking surface 910, the lip 920 is raised by a height 925. In one form, the height 925 is at least 1 cm, but the height 925 can be higher or even lower in other examples. The lip 920 prevents grease and/or food from falling off the edge of the griddle 140. The lip 920 also can act as a backstop when food, such as hamburgers, are lifted or flipped by a spatula.

Figure 10:
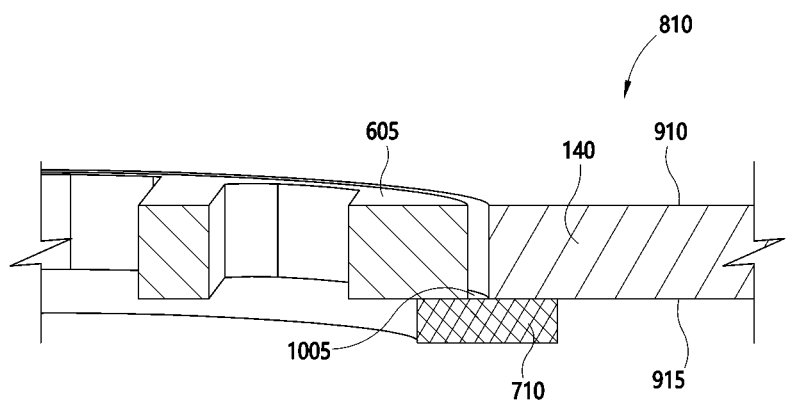
FIG. 10 is a partial cross-sectional view of the cooking section at an inner periphery.

Referring to FIG. 10, the support ring 710 forms a ledge 1005 on which the central grate 605 is supported. The ledge 1005 is fixed to the heating surface 915 of the griddle 140 by a weld, fastener, adhesive, and/or in other manners. The ledge 1005 allows the central grate 605 to be easily installed or removed from the cooking section 115. For example, a user can simply place the central grate 605 on the ledge 1005 to install the central grate 605. To remove the central grate 605, the user simply lifts up on the central grate 605. The central grate 605 is also shown to sit flush with the griddle 140. This means there is no bump or interruption in the smooth surface of the cooking section 115. This allows a user to place food items anywhere on the cooking section 115 without fear of spillage or uneven cooking.

Figure 11:
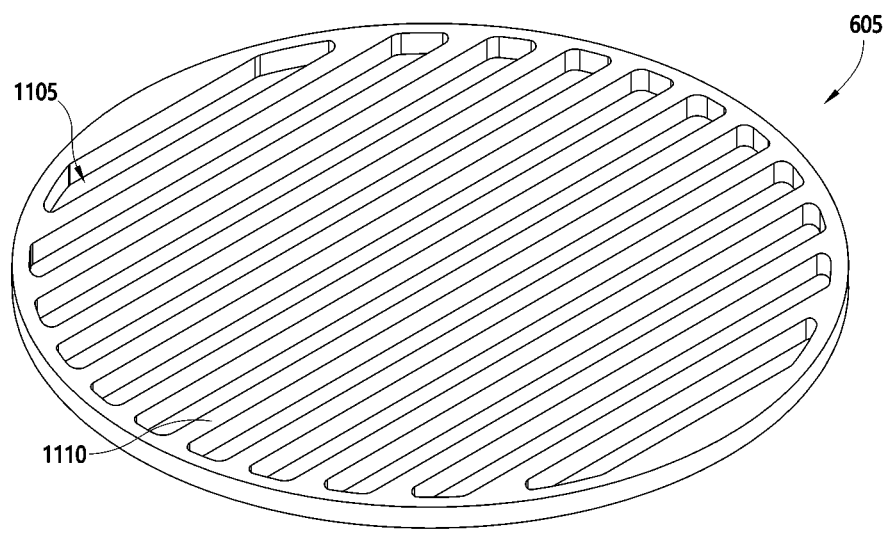
FIG. 11 is a perspective view of a central grate.
Figure 12:
FIG. 12 is a side view of the central grate of FIG. 11.

Turning to FIGS. 11 and 12, the central grate 605 includes one or more slots 1105 and one or more ribs 1110 that define the slots 1105. The slots 1105 allow grease and other liquids to drip from the food item and into the flames below. This allows foods cooked on the central grate 605 to release grease and other liquids that may be undesirable. The ribs 1110 form the support structure of the central grate 605. Alternatively or additionally, the ribs 1110 serve to create grill marks on the food item being cooked. In some embodiments, the ribs 1110 form a particular pattern or logo, for example, a sports logo that is transferred to the food item during cooking as grill marks. The central grate 605 also has a thickness 1205. The thickness 1205 is generally the same as the thickness of the griddle 140. This allows the central grate 605 to sit flush with the griddle 140 and create a smooth and unbroken surface for the cooking section 115.

Figure 13:
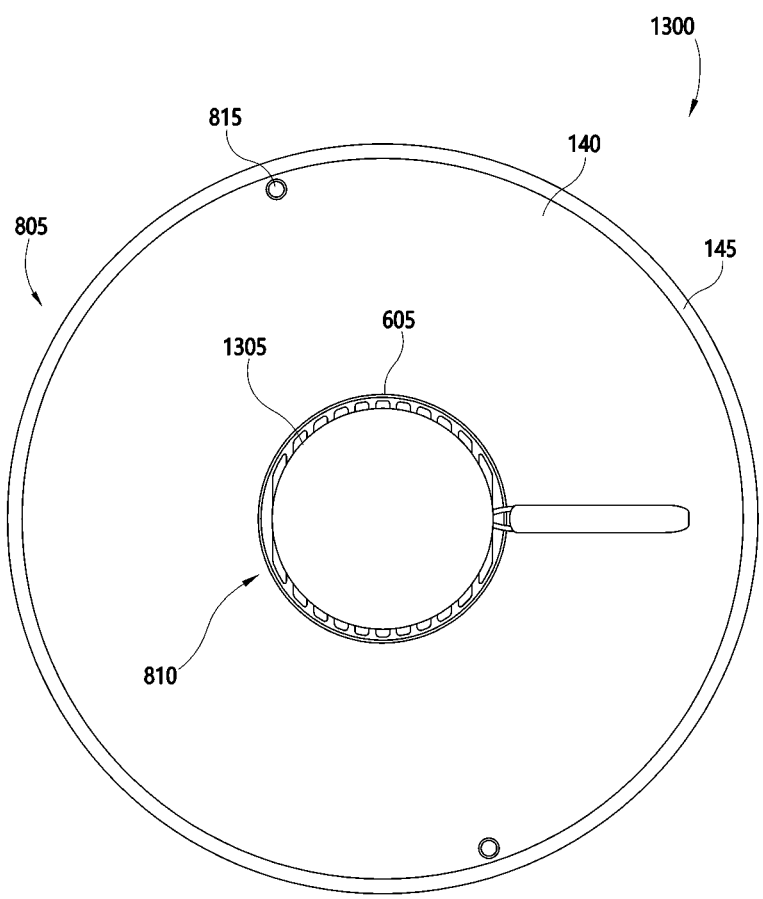
FIG. 13 is a top view of the cooking section including a pan.

An example of a cooking environment 1300 where a pan 1305 is heated by the grill 100 is show in in FIG. 13. As shown, the central grate 605 is sized to accommodate the pan 1305. The pan 1305 is generally placed on the central grate 605 in order to facilitate proper heating. In other examples, the central grate 605 can be sized and/or configured differently to accommodate differently sized pans 1305 or different cooking conditions. For example, the central grate 605 is smaller to accommodate a small pan 1305. In another example, the central grate 605 is sized larger to accommodate a large pan 1305, such as a lobster pot. As will be explained below, the central grate 605 can be raised from the cooking surface 910 of the griddle 140 so as to accommodate different exhaust and/or smoking conditions.

Figure 14:
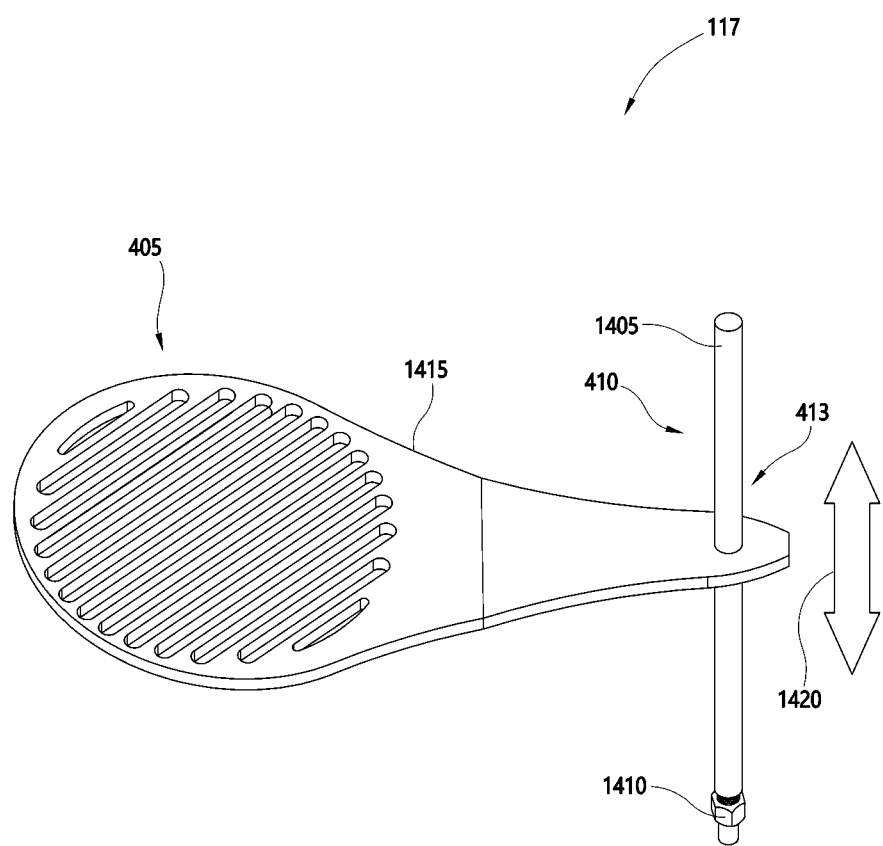
FIG. 14 is a perspective view of an accessory section of the grill of FIG. 1.

In the example illustrated in FIG. 14, the support 410 of the accessory section 117 includes a rod 1405. The rod 1405 is secured to the cooking section 115 of the grill 100 by a nut 1410. The rod 1405 is mounted by placing the threaded end through the mounting aperture 815 in the griddle 140. Following this, the nut 1410 is tightened. The tightening of the nut 1410 sandwiches the griddle 140 between the rod 1405 and the nut 1410. The sandwich configuration creates a study support for the cook accessory 405.

The accessory section 117 in the illustrated example includes an adjustable grate 1415. The adjustable grate 1415 is slidably mounted on the rod 1405. The adjustable grate 1415 can move or slide along the rod 1405 to adjust the vertical position of the adjustable grate 1415 as indicated by arrow 1420 in FIG. 14. For example, a user can move the adjustable grate 1415 to a higher position to create more distance from the heating source or cooking section 115. This in turn reduces the cooking temperature of the food on the adjustable grate 1415. In another example, the user can adjust the adjustable grate 1415 to a vertically lower position where the adjustable grate 1415 is located nearer to the flames and/or to facilitate faster cooking due to the more intense heat. As was discussed previously, the adjustable grate 1415 is also able to swing horizontally (FIG. 4) to adjust cooking conditions. For example, the adjustable grate 1415 can be rotated away from the flames when the food item is cooked. In another example, the adjustable grate 1415 can be rotated directly over the central grate 605 and/or open central opening 705 to smoke and/or cook the food on the adjustable grate 1415 more rapidly.

Figure 15:
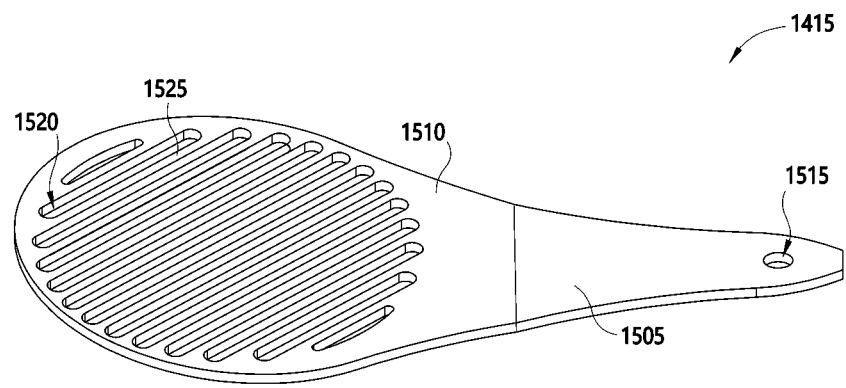
FIG. 15 is a perspective view of an adjustable grate of the grill of FIG. 1.

As shown in FIG. 15, the adjustable grate 1415 includes a handle 1505 and a grate 1510 that extends from the handle 1505. A user is able to grasp, move, and/or adjust the position of the adjustable grate 1415 through the handle 1505. The grate 1510 is where the food is normally placed for cooking and/or warming. In the illustrated example, the handle 1505 has a hole 1515 configured to received the support 410. The handle 1505 is configured to be adjusted by a user in order to add or remove the adjustable grate 1415 from the rod 1405. To install the adjustable grate 1415 onto the rod 1405, the individual slides the rod 1405 through the hole 1515 in the handle 1505 of the adjustable grate 1415.

The hole 1515 in conjunction with the rod 1405 forms the lock mechanism 413 (see e.g., FIGS. 4 and 14). The hole 1515 in the adjustable grate 1415 is shaped to automatically lock the adjustable grate 1415 into position once the user releases the adjustable grate 1415 through gravity. As can be seen, the hole 1515 is positioned at the end of the handle 1505 that is opposite the grate 1510. With the hole 1515 positioned offset from the center of gravity for the adjustable grate 1415, the hole 1515 tends to tilt downward which in turn causes the handle 1505 at the hole 1515 to frictionally grip with or bite into the rod 1405 so as to hold the adjustable grate 1415 at the desired vertical position. To readjust the vertical position of the adjustable grate 1415, the user simply lifts or tilts the handle 1505 upwards so that the adjustable grate 1415 is able to slide up or down along the rod 1405 to the desired vertical position. Once the user releases the handle 1505, the offset nature of the adjustable grate 1415 and gravity causes the grate 1510 to tilt downwards such that the adjustable grate 1415 locks into place with the rod 1405.

The grate 1510 has one or more slots 1520 defined between one or more ribs 1525. The slots 1520 allow grease and other liquids to drip from the food cooked on the grate 1510 and into the flame. The ribs 1525 support the food on the grate 1510, and the ribs 1525 create grill marks on the food during cooking. The adjustable grate 1415 is relatively small as compared to the entire grill 100. With this small size, the adjustable grate 1415 can be manufactured rather inexpensively. In one embodiment, the ribs 1525 form a pattern or logo, such as a sports team logo. Business owners can provide to potential customers and others the adjustable grate 1415 having the ribs 1525 configured to form a logo or other brand identifier for affinity or promotional purposes.

Figure 16:
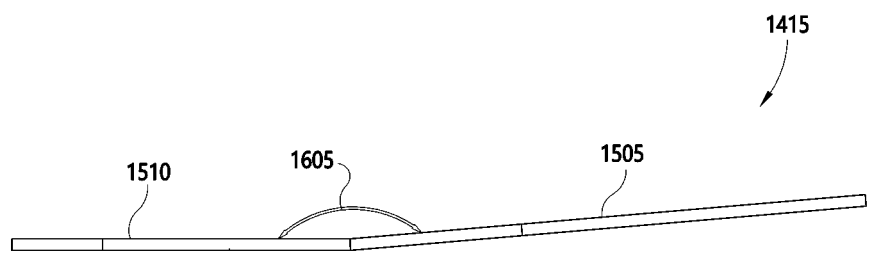
FIG. 16 is a side view of the adjustable grate of FIG. 15.
Figure 17:
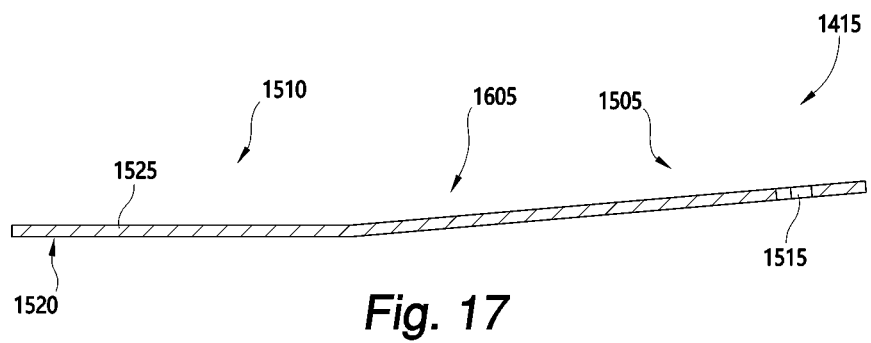
FIG. 17 is a cross-sectional view of the adjustable grate of FIG. 15

As depicted in FIGS. 16 and 17, the handle 1505 extends in a transverse manner relative to the grate 1510 such that handle 1505 of the adjustable grate 1415 is bent relative to the grate 1510. In particular, the handle 1505 and grate 1510 form an angle 1605 that is generally an obtuse angle. The angle 1605 is configured to allow the grate 1510 to extend relatively parallel with the cooking section 115 while the adjustable grate 1415 remains vertically locked to the rod 1405. Having the grate 1510 parallel with the cooking section 115 allows for even cooking of food on the adjustable grate 1415 by providing a flat cooking surface. The flat surface prevents food items from rolling or falling off of the adjustable grate 1415.

While the grate 1510 sits parallel with the cooking section 115 and generally transverse to the rod 1405, the handle 1505 extends at a non-perpendicular angle relative to the rod 1405. Again, this angling of the handle 1505 allows for an automatic locking of the adjustable grate 1415 with the rod 1405. In one form, the hole 1515 is bored in the handle 1505 generally perpendicular to the surface of the handle 1505. With this construction, when the user lifts or tilts the handle 1505 to an orientation relatively perpendicular with the rod 1405, the walls of the hole 1515 no longer firmly engage the rod 1405 such that the vertical position of the adjustable grate 1415 is able to be vertically adjusted. When the user releases the adjustable grate 1415, gravity forces the edges of the hole 1515 to lock into the rod 1405 and fix the adjustable grate 1415 into the desired position. This elegant design of the lock mechanism 413 promotes food safety because the cook accessory 405 is able to be easily cleaned.

Figure 18:
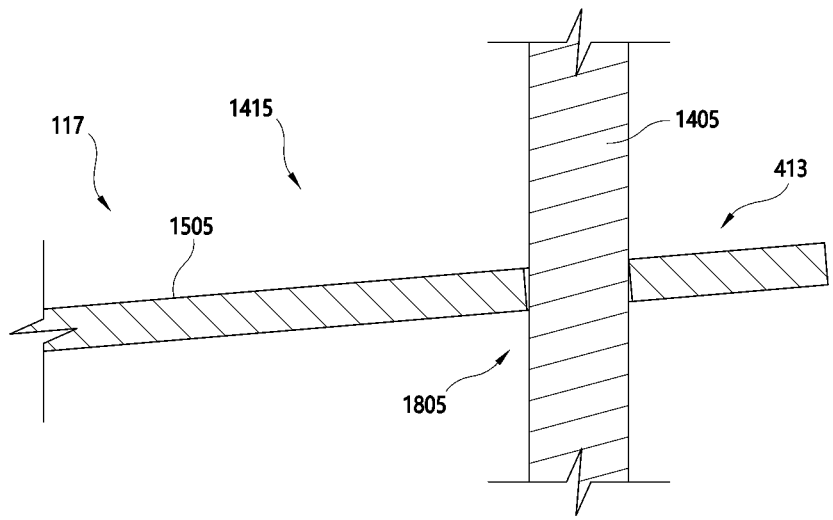
FIG. 18 is a partial cross-sectional view of the accessory section of FIG. 14.
Figure 19:
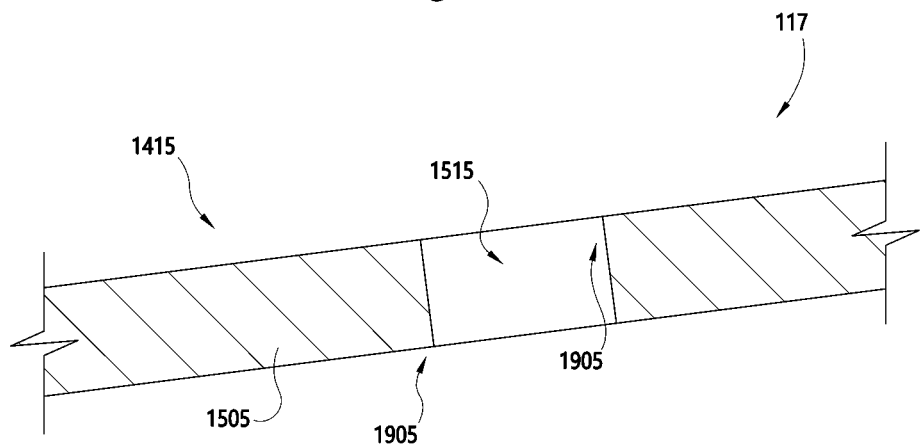
FIG. 19 is a partial cross-sectional view of a handle of the adjustable grate.

As depicted in FIGS. 18 and 19, the adjustable grate 1415 is secured to the rod 1405 to form an automatic lock connection 1805. The automatic lock connection 1805 allows the user to simply release the adjustable grate 1415 to lock in place at the desired height. Again, this automatic lock connection 1805 is maintained as a result of perpendicular faces 1905 or bore walls around the hole 1515 in the adjustable grate 1415. In one form, the perpendicular faces 1905 extend generally perpendicular to the outer surfaces of the handle 1505. In another form, the hole 1515 is bored at a transverse angle relative to the surfaces of the handle 1505 and/or the handle 1505. Once more, the angle of the hole 1515 allows the adjustable grate 1415 to lock into position. For example, the edges of the hole 1515 will sit at an angle to the rod 1405 when the adjustable grate 1415 is released. The edges of the hole 1515 frictionally engage or bite into the exterior of the rod 1405. The resulting high friction between the materials maintain the adjustable grate 1415 in the set vertical position until adjusted again by a user. It should be recognized that the adjustable grate 1415 can still be horizontally swung when locked in the vertical position.

Figure 20:
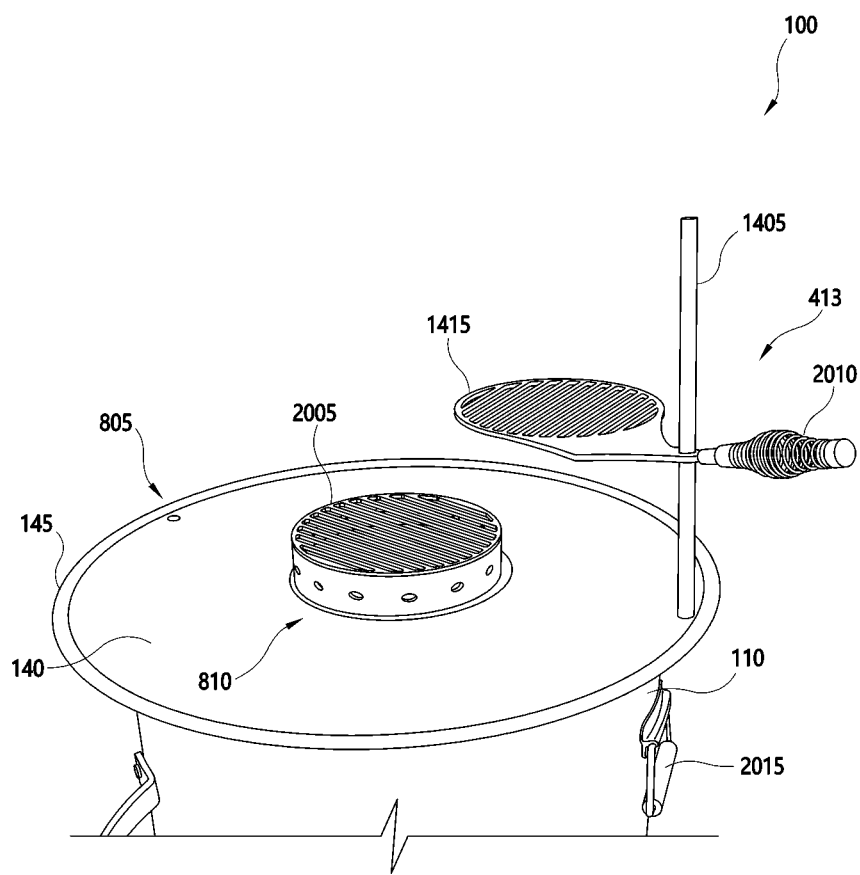
FIG. 20 is a perspective view of the grill including a raised center grate.

Referring to FIG. 20, an example of the grill 100 is shown with a raised center grate 2005. The raised center grate 2005 functions similarly to the central grate 605. However, the raised center grate 2005 has a raised profile that creates a ledge above the griddle 140. The ledge allows a user to more easily maneuver food items onto a spatula. For example, a user can pin a food item between the ledge and the spatula. The raised center grate 2005 also provides distance from the flame to the food item, for example, steaks that may burn easily. Placing food items that may burn easily further from the flame is advantageous.

In the illustrated example, the adjustable grate 1415 further includes a coiled handle 2010. The coiled handle 2010 serves as a safeguard against burns. For example, as the adjustable grate 1415 gets hot, the heat is spread through conduction throughout the coiled handle 2010. Following this, convection cools the coiled handle 2010 and maintains the coiled handle 2010 at a safe temperature for a user. The heating section 110 further includes one or more lifting handles 2015. The lifting handles 2015 allow the user to move the grill 100 easily and conveniently, for example, if the user needs to place the grill 100 under an awning because of inclement weather. The user simply grasps the lifting handle 2015 and moves the grill 100, with less concern for being burned.

Figure 21:
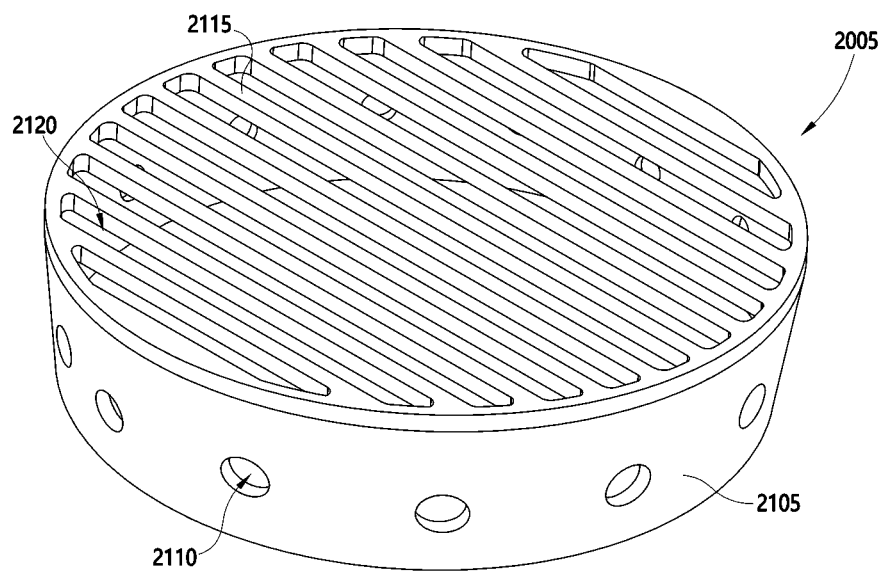
FIG. 21 is a perspective view of the raised center grate of FIG. 20.
Figure 22:
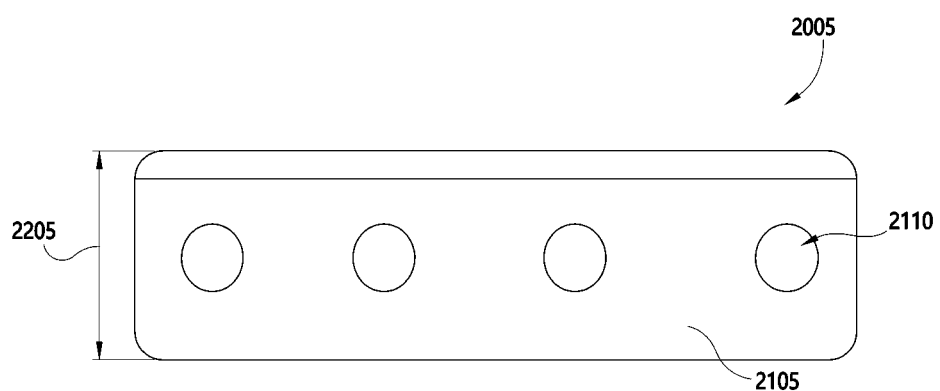
FIG. 22 is a side view of the raised center grate of FIG. 20.

As shown in FIGS. 21 and 22, the raised center grate 2005 includes a sidewall 2105 with one or more sidewall vents 2110. The sidewall vents 2110 allow smoke to exhaust in a generally uniform manner. The sidewall vents 2110 also reduce the weight of the raised center grate 2005 which also reduces the stress on the support ring 710. The raised center grate 2005 further includes one or more ribs 2115 and one or more slots 2120. As has been discussed previously, the ribs 2115 are configured to support and grill any food on the raised center grate 2005. Once more, the ribs 2115 can create desirable grill marks on the food. In one example, the ribs 2115 create a logo, such as a sports logo, that is transferred to the food item as grill marks. Like before, the slots 2120 allow grease and other liquids to drip from the food item.

The sidewall 2105 has a thickness 2205. The thickness 2205 regulates the amount of the thickness 2205 that protrudes above the griddle 140. For example, the larger the thickness 2205, the larger the protrusion of the thickness 2205 above the griddle 140. As noted, before, this thickness 2205 can be used to reduce the cooking temperature.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Accessory" or "Cook Accessory" generally refers to a structure and/or mechanism used to position or move food over a over a cooking surface, equipment, or area, such as a grill, that is permanently, semi-permanently, or removably secured to the cooking equipment. Unlike a cooking utensil, the cook accessory is configured to hold food at a static position or move the food along a predefined path over the equipment during cooking. Some non-limiting examples of cooking accessories includes grates, griddles, baskets, and rotisseries.

"Acute" or "Acute Angle" generally refers to an angle smaller than a right angle or less than 90 degrees.

"Concave" generally refers to a surface that is hollowed or rounded inward in at least one dimension like the inside of a bowl or a groove.

"Fire Box" or "Fire Basket" generally refers to the component of a grill that contains the fuel burned to cook food. The fire box is generally located directly below the cooking surface and is filled with coal, charcoal, wood, briquettes, and/or another heat source. The fire box is generally made of a durable metallic material. For example, the fire box may be made of steel, iron, stainless steel, and/or aluminum. The fire box may be a variety of shapes and styles. For example, a fire box may be rectangular, circular, conical, and/or frustoconical. Additionally, the fire box may be loaded with fuel from the side or from above. A fire box may also include one or more vents to allow air into the heating area in order to create more heat. The vents may also be closed off to restrict air flow and lower the flames.

"Frustoconical" generally refers to the shape of a frustum of a cone. In other words, frustoconical generally refers to a shape defined by the remainder of a cone or pyramid that lies between the base and a plane parallel to the base. Generally, the intersecting portion of the cone has been removed by a plane parallel to the base of the cone. This shape includes two open ends, one at the base and one at the intersecting plane.

"Griddle" generally refers to a flat, continuous surface on which food is baked and/or fried. The griddle can come in a variety of shapes such as a circular or rectangular shape. Typically, but not always, the griddle is made of a thermally conductive material. For example, the griddle can be made of chrome steel, aluminum, iron, carbon steel, and/or stainless steel.

"Grill" generally refers to a device used for cooking food. Typically, a grill is heated from below by gas, electricity, wood, charcoal, and/or any other heat producing substance. Grills range in a variety of sizes from small, single person grills, to large industrial sized grills. Additionally, grills may be a variety of shapes from the typical rectangular grill to a cylindrical shaped grill. Grills typically include a cooking grate or cooking grid used to place food for cooking. Alternately, a grill may include a griddle like flat surface as opposed to the more common cooking grate. In other examples, a grill may include multiple accessories such as a rotisserie, pizza oven, hood, and/or pot.

"Handle" generally refers to a part that is designed especially to be grasped by a human hand. In other words, a handle is a part by which an object, such as a tool or device, is held, carried, and/or controlled by a human hand. A handle typically has sufficient strength to support the object. For tools, the handle typically has sufficient strength to transmit any force from the handle to perform the designed functionality for the tool. The handle usually has a sufficient length to accommodate a single hand or multiple hands to grip and reliably exert force through the handle. Similarly, the handle commonly has a sufficiently small circumference or exterior size to permit single hand or multiple hands to reliably grip the handle. Other ergonomic factors, such friction, coating, grip, and injury prevention features, can be incorporated into the handle. By way of non-limiting examples, the handles can include broom handles, shovel handles, pull handles, or twist handles, to name just a few.

"Horizontal" generally refers to a plane or direction. An item that moves in the sideways direction is generally said to move horizontally. For example, a lever fixed on one end to a rod that is able to move to the left and right is said to move horizontally.

"Longitudinal" generally refers to the length or lengthwise dimension of an object, rather than across.

"Obtuse" or "Obtuse Angle" generally refers to an angle greater than 90 degrees but less than 180 degrees.

"Retention Ledge" generally refers to a ledge, or narrow projecting surface, which serves the purpose of retaining an item. In one example, a retention ledge is configured to prevent food items from falling off of a tray. In another example, a retention ledge may surround a griddle surface to prevent food from falling onto the ground. A retention ledge may also serve as a backstop to assist a user in maneuvering food items onto a spatula or plate.

"Thickness" generally refers to the measure of the distance between opposite sides of an object. As used here, the thickness of an object that is positioned between two surfaces is measured from between the two sides of the object that contact the surfaces.

"Transverse" generally refers to things, axes, straight lines, planes, or geometric shapes extending in a nonparallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Vertical" generally refers to a plane or direction. An item that moves upward or downward is generally said to move vertically. For example, an item that is able to move up and down is said to move vertically.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | grill |
| 105 | support section |
| 110 | heating section |
| 115 | cooking section |
| 117 | accessory section |
| 132 | body |
| 133 | dampener |
| 135 | mounting holes |
| 140 | griddle |
| 145 | retention ledge |
| 205 | fire box |
| 207 | sidewall |
| 210 | base |
| 215 | intake hole |
| 220 | aperture |
| 405 | cook accessory |
| 410 | support |
| 413 | lock mechanism |
| 415 | arrows |
| 505 | support rack |
| 510 | struts |
| 515 | cross members |
| 605 | central grate |
| 705 | central opening |
| 710 | support ring |
| 805 | outer periphery |
| 810 | inner periphery |
| 815 | mounting aperture |
| 905 | weld |
| 910 | cooking surface |
| 915 | heating surface |
| 920 | lip |
| 925 | height |
| 1005 | ledge |
| 1105 | slot |
| 1110 | rib |
| 1205 | thickness |
| 1300 | cooking environment |
| 1305 | pan |
| 1405 | rod |
| 1410 | nut |
| 1415 | adjustable grate |
| 1420 | arrow |
| 1505 | handle |
| 1510 | grate |
| 1515 | hole |
| 1520 | slot |
| 1525 | rib |
| 1605 | angle |
| 1805 | automatic lock connection |
| 1905 | perpendicular faces |
| 2005 | raised center grate |
| 2010 | coiled handle |
| 2015 | lifting handle |
| 2105 | sidewall |
| 2110 | sidewall vents |
| 2115 | rib |
| 2120 | slot |
| 2205 | thickness |

The invention claimed is:

1. A grill, comprising:
a griddle, wherein the griddle defines a central opening;
a rod mounted to the griddle;
an accessory coupled to the rod;
wherein the accessory includes a handle coupled to the rod and a head extending from the handle;
wherein the handle is configured to slide relative to the rod in a vertical direction;
wherein the accessory is configured to swing in a horizontal direction relative to the rod; and
wherein the head of the accessory is configured to swing from at least a first position where the head is positioned over the central opening to a second position where the head is positioned over the griddle.

2. The grill of claim 1, wherein a first rod and a second rod are mounted at opposing sides of the griddle.

3. The grill of claim 1, wherein the head of the accessory includes a grate.

4. The grill of claim 3, wherein the handle extends from the grate at an obtuse angle so the grate is parallel to the griddle.

5. The grill of claim 4, wherein the handle is configured to automatically lock to the rod at a vertical position when released.

6. The grill of claim 3, wherein:
the grate includes ribs that define grate slots; and
the ribs are arranged in a pattern to create grill marks in a shape of a logo.

7. The grill of claim 1, wherein the head of the accessory is configured to swing from the second position to a third position where the head is positioned away from the griddle.

8. A grill, comprising:
a griddle;
a heating section, wherein the heating section includes a body and a fire box supported by the body;
wherein the fire box is positioned below the griddle to heat the griddle;
wherein the fire box has a base and a sidewall extending from the base;
wherein the sidewall of the fire box has a frustoconical shape; and
wherein the sidewall of the fire box is spaced away from the body to reduce heat transfer from the fire box to the body.

9. The grill of claim 8, wherein the grill includes a drum on which the griddle rests, and wherein the drum has a height that locates the griddle at a standing height of a user.

10. The grill of claim 8, wherein the body defines a dampener to intake air into the fire box.

11. The grill of claim 8, wherein the griddle defines a central opening, and wherein the fire box is configured to exhaust smoke through the central opening.

12. A grill, comprising:
a griddle, wherein the griddle defines a central opening;
a central grate that covers the central opening;
wherein the central grate has ribs that define grate openings;
wherein the central grate is flush with a cooking surface surrounding the central opening of the griddle to facilitate sliding of food between the griddle and the central grate;
wherein the griddle has a retention ledge surrounding an outer circumference of the griddle;
wherein the retention ledge has a raised lip that extends from the cooking surface;
wherein the raised lip inhibits food from sliding off the griddle;
wherein the griddle has a smooth continuous cooking surface on which food is cooked; and
wherein the cooking surface surrounding the central opening of the griddle is flat.

13. The grill of claim 12, wherein the retention ledge includes a rod welded around the outer circumference of the griddle.

14. The grill of claim 12, wherein the griddle has a concave shape, and wherein the concave shape directs material on the griddle towards the central opening.

15. The grill of claim 12, wherein the grill has a shoulder around the central opening on which the central grate rests flush with the griddle.

16. The grill of claim 15, wherein the griddle is flat around the central opening to promote drainage from the griddle into the central opening.

\* \* \* \* \*